United States Patent
Dries

(10) Patent No.: US 8,951,336 B2
(45) Date of Patent: Feb. 10, 2015

(54) VESSEL FOR REMOVING SOLID PARTICLES FROM GASES

(75) Inventor: Hubertus Wilhelmus Albertus Dries, Amsterdam (NL)

(73) Assignee: Shell Oil Company, Houston, TX (US)

(*) Notice: Subject to any disclaimer, the term of this patent is extended or adjusted under 35 U.S.C. 154(b) by 301 days.

(21) Appl. No.: 13/258,037

(22) PCT Filed: Mar. 22, 2010

(86) PCT No.: PCT/EP2010/053709
§ 371 (c)(1),
(2), (4) Date: Sep. 21, 2011

(87) PCT Pub. No.: WO2010/108889
PCT Pub. Date: Sep. 30, 2010

(65) Prior Publication Data
US 2012/0012003 A1    Jan. 19, 2012

Related U.S. Application Data

(60) Provisional application No. 61/162,527, filed on Mar. 23, 2009.

(30) Foreign Application Priority Data

Mar. 23, 2009 (EP) ..................................... 09155858

(51) Int. Cl.
*B01D 45/00* (2006.01)
*B01D 50/00* (2006.01)
(Continued)

(52) U.S. Cl.
CPC .............. *B01D 50/002* (2013.01); *B01D 45/12* (2013.01); *B01D 46/2407* (2013.01); *B01D 46/0068* (2013.01); *B01D 2265/06* (2013.01)

USPC .............. 95/268; 55/447; 55/459.1; 55/346; 55/344; 55/349; 55/424; 55/426; 55/522; 55/523; 55/527; 55/490; 55/498; 55/494; 55/323; 55/301; 55/304; 55/324; 55/337

(58) Field of Classification Search
USPC ........ 55/447, 459.1, 346, 344, 349, 424, 426, 55/522, 523, 527, 490, 498, 494, 323, 301, 55/304, 324, 337
See application file for complete search history.

(56) References Cited

U.S. PATENT DOCUMENTS 4,989,408 A * 2/1991 Leonhard et al. ............... 60/303
5,514,195 A   5/1996 Durst et al.
(Continued)

FOREIGN PATENT DOCUMENTS

DE       3515365         7/1986   ............ B01D 46/24
DE     19826002 A1      10/1999
(Continued)

*Primary Examiner* — Dung H Bui

(57) ABSTRACT

The invention is directed to a vessel for separating solid particles from a gas containing solid particles, said vessel comprising a plate provided with openings across the vessel such that the plate divides the vessel in a first and second space, a number of filter elements extending from the openings into the first space, a vessel opening for receiving the gas containing solid particles, fluidly connected to the first space, an vessel outlet opening for discharge of solids, fluidly connected to the first space and a vessel outlet opening for gas, fluidly connected to the second space. The first space further comprises one or more cyclone separation devices having an inlet fluidly connected to the vessel opening for receiving the gas containing solid particles, a cyclone gas outlet fluidly connected to the first space and a solids cyclone outlet.

8 Claims, 4 Drawing Sheets

(51) Int. Cl.
  *B01D 45/12* (2006.01)
  *B01D 46/24* (2006.01)
  *B01D 46/00* (2006.01)

(56) References Cited

U.S. PATENT DOCUMENTS

| | | | | |
|---|---|---|---|---|
| 5,788,746 | A * | 8/1998 | Bartling | 95/268 |
| 7,182,799 | B2 * | 2/2007 | Dries | 55/341.1 |
| 2005/0160707 | A1 * | 7/2005 | Dries | 55/418 |

FOREIGN PATENT DOCUMENTS

| | | | |
|---|---|---|---|
| EP | 0774289 | 5/1997 | ............ B01D 46/00 |
| GB | 1236017 | 6/1971 | ............ B01D 46/24 |
| JP | 49-133970 A | 12/1974 | |
| JP | 55065118 A | 5/1980 | |
| JP | 10204453 A | 8/1998 | |
| JP | 2000303078 | 10/2000 | ............ B01D 46/24 |
| JP | 2005007229 A | 1/2005 | |
| WO | WO9320924 | 10/1993 | ............ B10D 36/24 |
| WO | WO03080221 | 10/2003 | ............ B01D 46/24 |

* cited by examiner

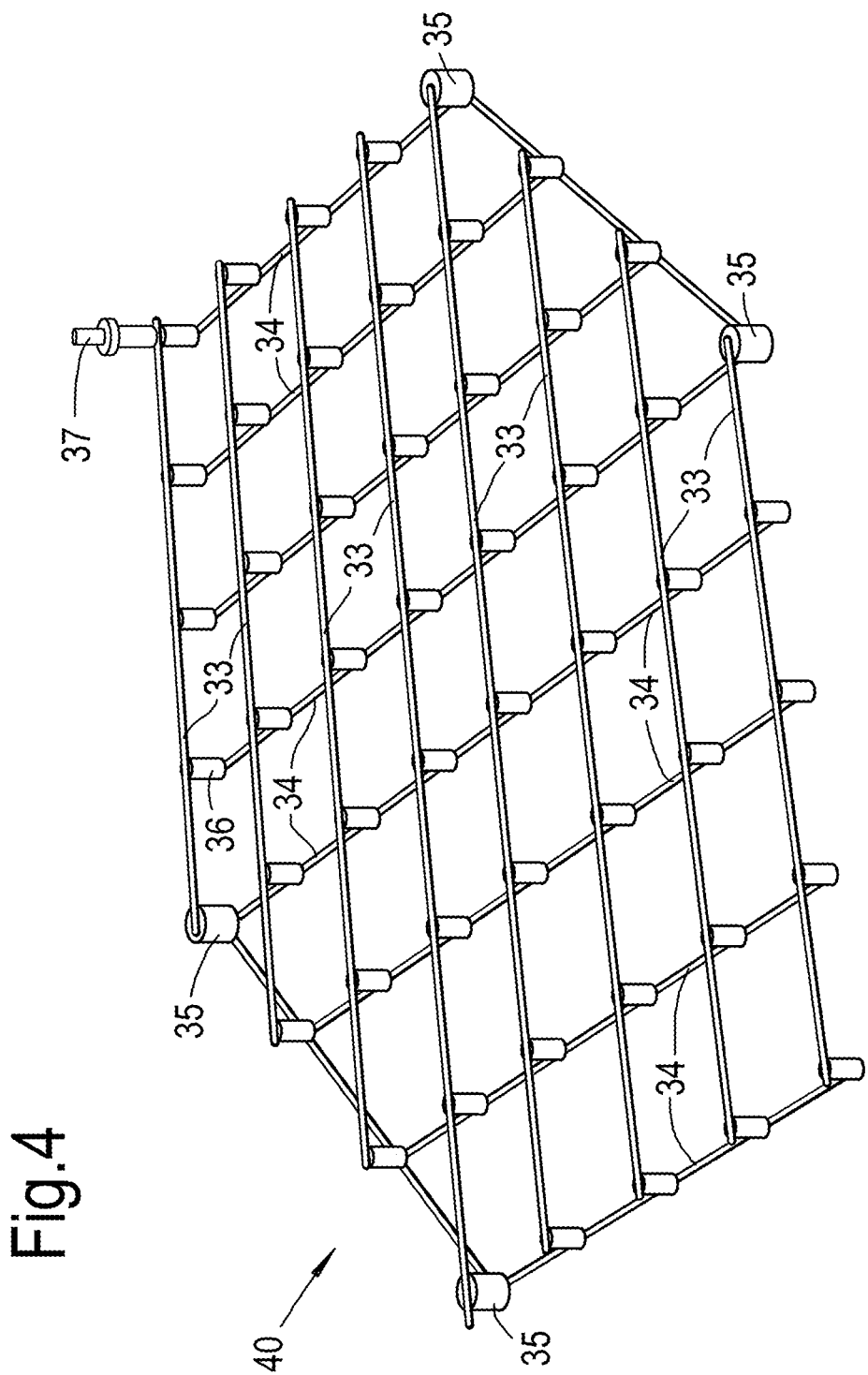

VESSEL FOR REMOVING SOLID PARTICLES FROM GASES

PRIORITY CLAIM

The present application claims priority from PCT/EP2010/053709, filed 22 Mar. 2010, which claims priority from European Application 09155858.5, filed 23 Mar. 2009 and U.S. Provisional Application No. 61/162,527, filed 23 Mar. 2009.

BACKGROUND

The present invention relates to a vessel for removing solid particles from gases.

WO-A-93/20924 describes such a vessel. In this publication a vessel for separating solid particles from a gas containing solid particles is described. The vessel has a plate provided with openings across the vessel such that the plate divides the vessel in a first and second space. A number of filter elements extend from the openings into the first space. The vessel is furthermore provided with a vessel opening for receiving the gas containing solid particles, fluidly connected to the first space, an vessel outlet opening for discharge of solids, fluidly connected to the first space and a vessel outlet opening for gas, fluidly connected to the second space. The vessel for receiving the gas containing solid particles is connected to an inlet pipe, which delivers the gas in the vicinity of the plate.

A disadvantage of such a pipe-arrangement in the vessel is that large vessels are required when dealing with large quantities of gas and solids fed to such a vessel.

The present invention is directed to an improved vessel.

SUMMARY OF THE INVENTION

The invention is directed to the following vessel. A vessel for separating solid particles from a gas containing solid particles, said vessel comprising a plate provided with openings across the vessel such that the plate divides the vessel in a first and second space, a number of filter elements extending from the openings into the first space, a vessel opening for receiving the gas containing solid particles, fluidly connected to the first space, an vessel outlet opening for discharge of solids, fluidly connected to the first space and a vessel outlet opening for gas, fluidly connected to the second space, wherein the first space further comprises one or more cyclone separation devices having an inlet fluidly connected to the vessel opening for receiving the gas containing solid particles, a cyclone gas outlet fluidly connected to the first space and a solids cyclone outlet.

The vessel further comprises a two-tiered or two-sectioned grid to which the bottom of the filter elements is attached. The two-tiered grid allows for the flow through of solids particles while minimising the build up of ash or particle "bridges" that restrict flow.

BRIEF DESCRIPTION OF THE DRAWINGS

FIG. 4 illustrates an embodiment of the grid.

DETAILED DESCRIPTION OF THE INVENTION

Figure 1:
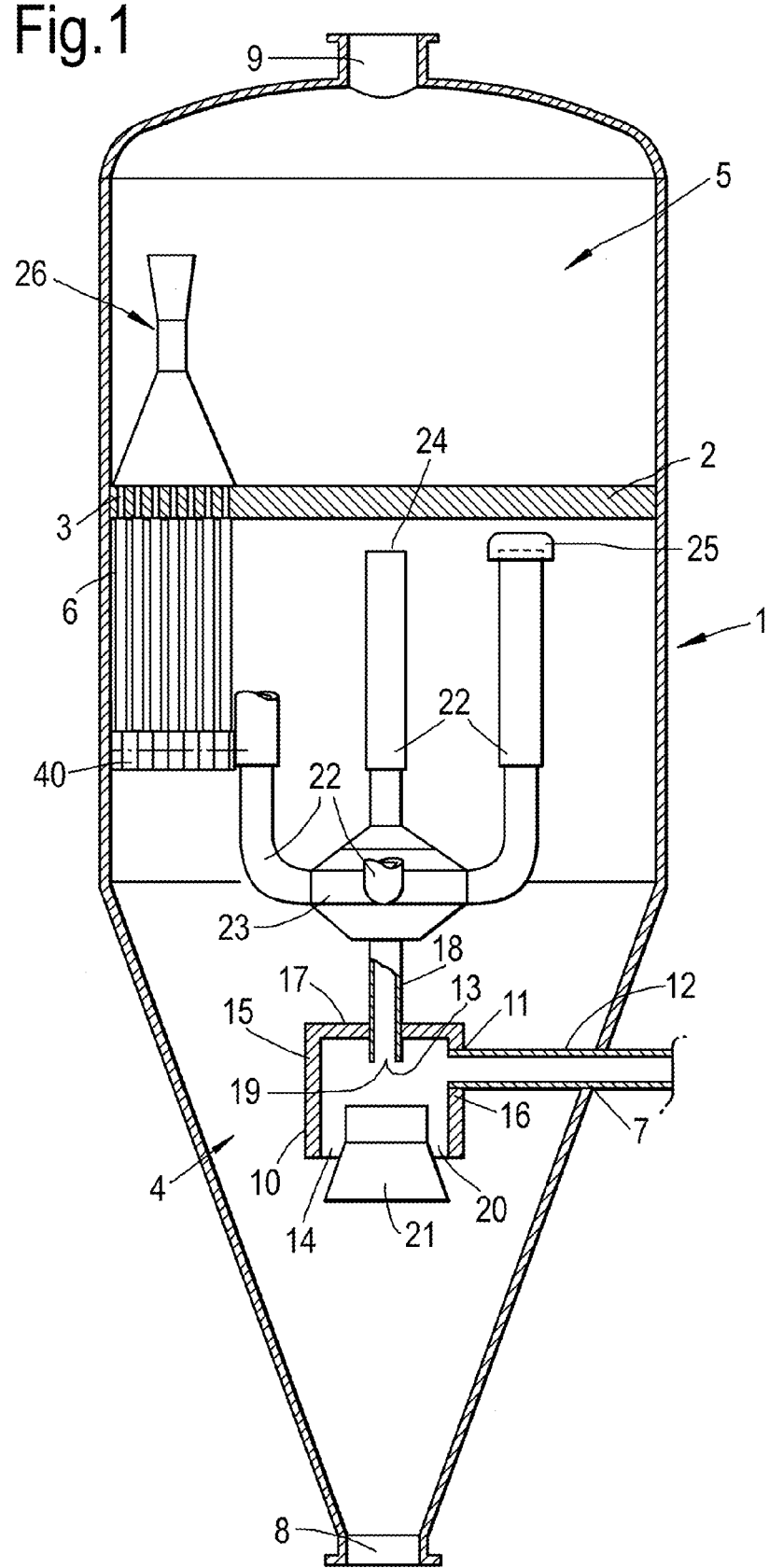
FIG. 1 illustrates a filter vessel according to the present invention having one centrally arranged cyclone separation device.

Applicants have found that with the vessel according to the invention the solids load on the filter elements can be significantly reduced. This results in that either less filter elements are required for the same separation capacity or that the same number of candles can be used, however much more closely spaced. Another advantage is that existing vessels can be de-bottlenecked by adding the cyclone separator devices, in case the filters are overloaded by solids. The cyclone separation device is compact in height and has an inverted cone-section in its gas outlet, as more specifically described below. These two design elements result in a "good" but not "best" separation performance. This allows some coarse particles to flow to the filters, which limits the amount of fine particles accumulating in the filters which can cause clogging of the filters. An accumulation of fine particles can also clog the vessel outlet opening for the discharge of solids.

The cyclone separation device preferably comprises a tubular wall section, which wall section is open at the solids cyclone outlet and closed by a cyclone roof at its opposite end. The outlet conduit is suitably positioned co-axial with the tubular wall section through said cyclone roof. The inlet of the outlet conduit is the cyclone gas outlet.

In a preferred embodiment a hollow cone shaped insert is co-axially positioned in the open end of the tubular wall section. The tubular wall section is provided with a tangentially arranged inlet fluidly connected to the vessel opening for receiving the gas containing solid particles. This tangential inlet will result in use that the gas and solids will rotate along the axis of the tubular wall section, wherein the solids will accumulate near the wall of the section and a gas more poor in solids will result in the centre of the section. The cone shaped insert has a, locally, smaller diameter than said tubular wall section to create a circular solids cyclone outlet between said insert and the tubular wall. The hollow cone shaped insert will direct the downwardly moving solids as present near the wall of the tubular wall section away from the centre of the tubular wall section and into the first space. Simultaneously gasses as present in the first space will enter from below the tubular wall section. These gasses may result for instance from the blow-back of a series of the filter elements. If the hollow cone shaped insert were not present, this counter-flow of gas might otherwise block off the outflow of solids down the cyclone.

Preferably the cyclone gas outlet is fluidly connected to the first space via a conduit having a gas outlet, which is closer to the filter elements than to the vessel outlet opening for discharge of solids. In this manner the gas as discharged from the cyclone, which gas is more poor in solids as compared to the starting gas, is transported to the region where the filter elements are present in said vessel.

The vessel according to the invention may suitably have from 2 to 6 cyclone separation devices connected to the vessel opening for receiving the gas containing solid particles.

FIG. 1 illustrates a filter vessel according to the present invention having one centrally arranged cyclone separation device.

Figure 2:
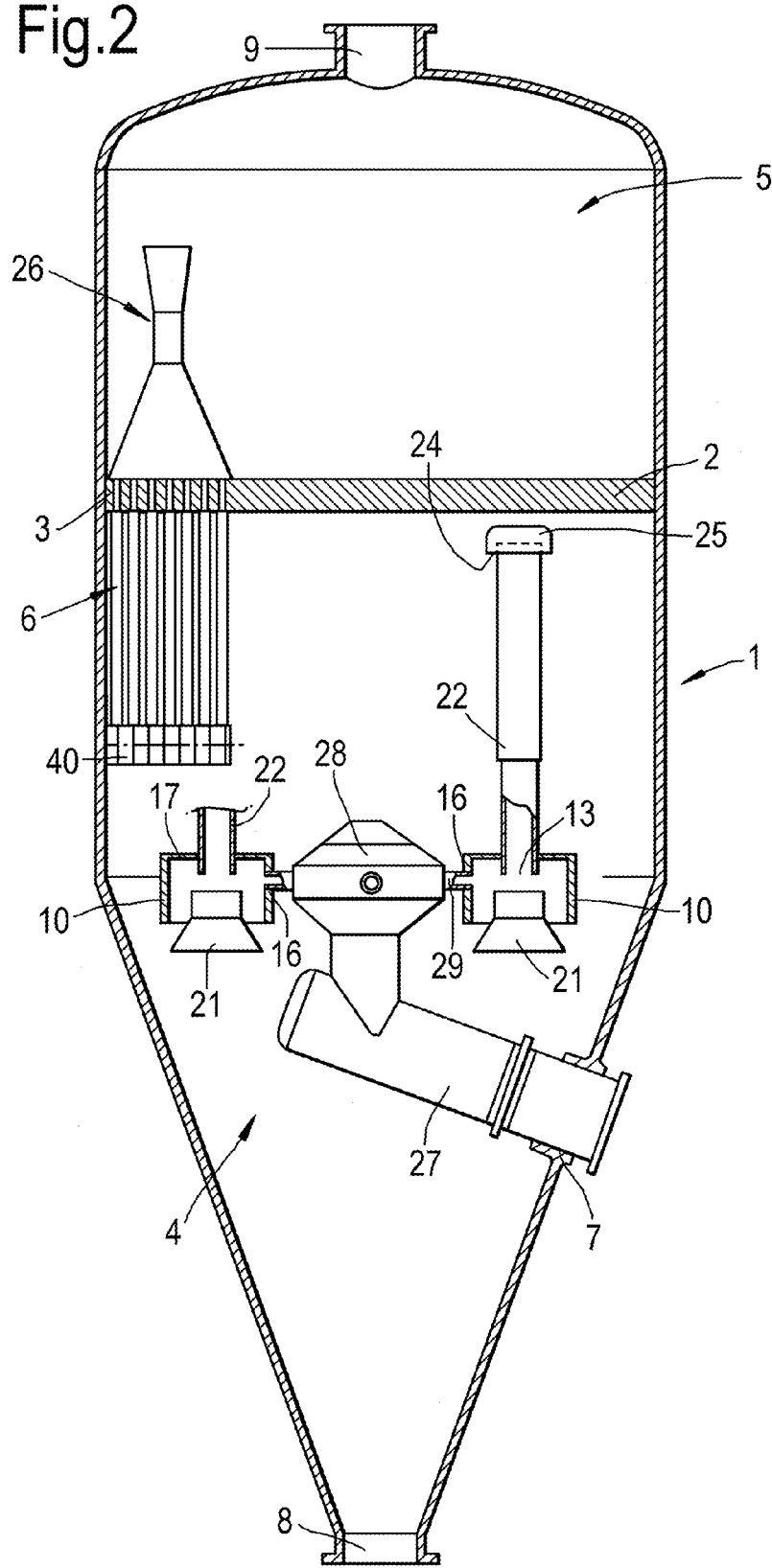
FIG. 2 illustrates a filter vessel according to the present invention having more than one cyclone separation devices.

FIG. 2 illustrates a filter vessel according to the present invention having more than one cyclone separation devices.

Figure 3:
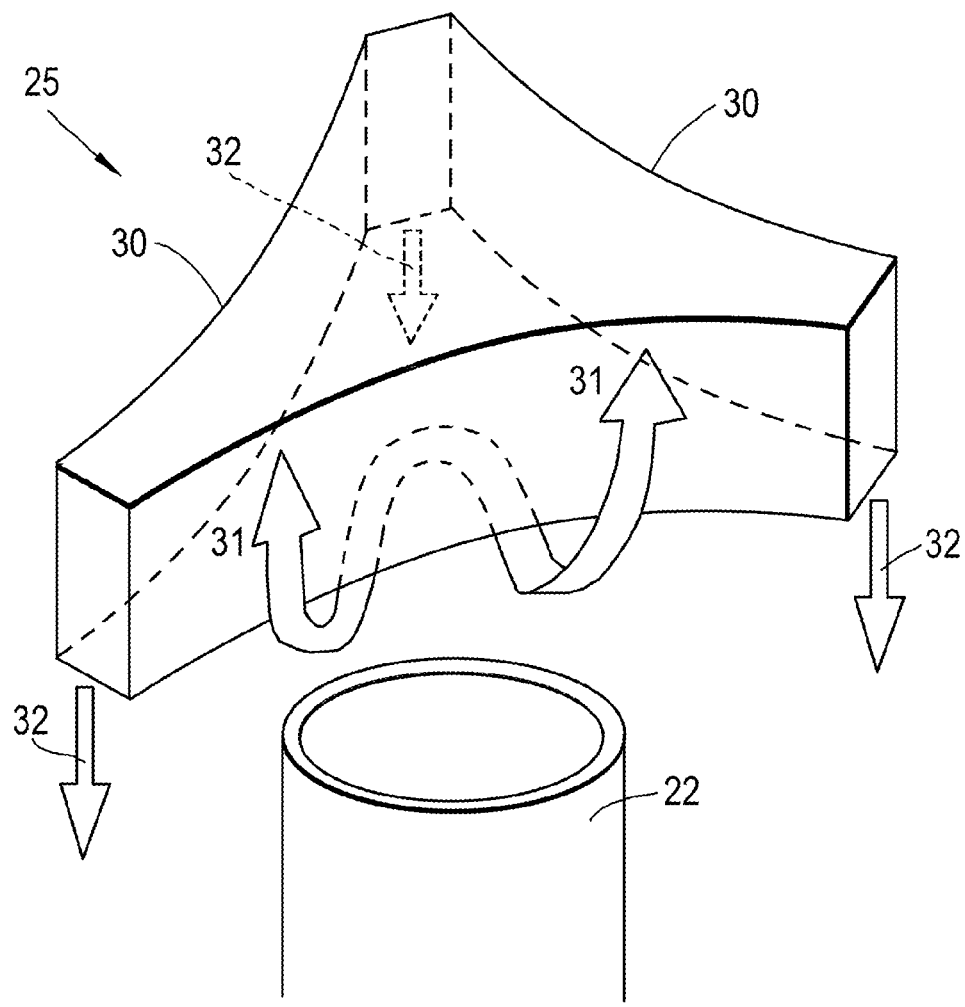
FIG. 3 illustrates a triangular cap for the conduits conducting the gas to the filter elements.

FIG. 3 illustrates a triangular cap for the conduits conducting the gas to the filter elements.

FIG. 4 illustrates an embodiment of the grid.

FIG. 1 shows a vessel 1 for separating solid particles from a gas containing solid particles. The vessel 1 comprises a plate 2 provided across the vessel 1 such that the plate 2 divides the vessel in a first space 4 and second space 5. The plate 2 is provided with openings 3. From said openings 3 a number of filter elements 6 extend into the first space 4. Filter elements 6 are fixed at the opposite end from plate 2 to grid 40 by means of filter supports 37 (as shown in FIG. 4). The vessel 1 is further provided with a vessel opening 7 for receiving the gas containing solid particles. The vessel opening 7 is fluidly connected to the first space 4. The vessel 1 is further provided with a vessel outlet opening 8 for discharge of solids, fluidly connected to the first space 4 and a vessel outlet opening 9 for a gas even more poor of solids, fluidly connected to the second space 5.

The first space 4 further comprises one cyclone separation device 10 having an inlet 11 fluidly connected to the vessel opening 7 for receiving the gas containing solid particles via inlet conduit 12. The cyclone separation device 10 is further provided with a cyclone gas outlet 13 fluidly connected to the first space 4.

The cyclone separation device 10 comprises of a tubular wall section 15. The wall section 15 is provided with a tangentially arranged inlet 16 that is fluidly connected to the vessel opening 7 for receiving the gas containing solid particles. The wall section 15 is open at the solids cyclone outlet 14 and closed by a cyclone roof 17 at its opposite. An outlet conduit 18 is positioned co-axial with the tubular wall section 15 through said cyclone roof 17. The inlet 19 of the outlet conduit 18 is the cyclone gas outlet 13 for gas more poor in solids.

Preferably in the open end 20 of the tubular wall section 15 a hollow cone shaped insert 21 is co-axially positioned having a, locally, smaller diameter than said tubular wall section 15 to create a circular solids cyclone outlet 14 between said insert and the tubular wall.

The cyclone gas outlet 13 is fluidly connected to the first space 4 via a conduit pipes 22 and distributor 23. The gas outlet 24 of said pipes 22 is closer to the filter elements than to the vessel outlet opening 8 for discharge of solids. Preferably the outlet 24 is in the vicinity of the plate 2 to deliver the gas more poor in solids to the space where the filter elements 6 are positioned. At this outlet a cap 25 may be present to redirect the gas to said filter elements 6.

FIG. 1 also shows one example of a cleaning device 26 using pressurised gas back-flow. Cleaning device 26 acts as a counter-flow ejector to clean filter elements 6. Other designs for device 26, which use gas back-flow, are also possible. The design of the vessel itself, the plate 2, filter elements 6, cleaning device 26, distributor 23, pipes 22 and cap 25 may be as disclosed in the afore mentioned WO-A-93/20924.

FIG. 2 shows an embodiment wherein two or more cyclone separation devices are present. The design of this device may be as in FIG. 1, apart from the dimensions, which will suitably be smaller. The reference numbers of FIG. 1 therefore also apply to this Figure for the same functional elements. FIG. 2 shows a central inlet pipe 27 connecting inlet 7 with a distributor 28. In distributor 28 the gas containing solid particles is split into 2 to 6 streams. Each stream is fed to the cyclone separation devices 10 via pipe section 29. The cyclone gas outlet 13 is fluidly connected to pipes 22 through which the gas more poor in solids is delivered to a position near the plate as in FIG. 1. In FIG. 2 only two cyclone separation devices are shown for clarity reasons.

The particular type of filter element 6 or elements 6 employed in the invention as illustrated by FIGS. 1 and 2 is a matter of choice. However, the invention is particularly adapted to high temperature and/or high pressure use. Thus, the primary filter element or filter elements employed may be composed or constructed of material suitable for pressure or vacuum service, which may include high temperature service. "High temperature service" in the context of the invention, refers to temperatures of perhaps 100° C. to 1500° C., advantageously 200° C. to 650° C. The operating pressure may be between 1 to 100 bars. In general, a cylindrically-shaped filter element made of rigid or flexible, felted or non-felted, multiple or single layer material fabric or porous, monolithic (ceramic, metal, or plastic) substances may be used. The spacing between the filter elements is a function of the dimensions of the filter elements and the particulate concentration of the fluid-particulate mixture.

The filter elements are typically arranged in a honeycomb pattern, spaced according to their dimensions. The pipes 22 and filter caps 25 may extend between bundles of filter elements.

FIG. 3 shows an embodiment of the cap (25) wherein cap (25) is triangular in shape. In the embodiment shown in FIG. 3, the flanges (30) of cap (25) are bowed slightly inward. Arrows (31) indicate the flow of gas and arrow (32) indicates the flow of particles, at one side and one corner. Preferably, the area of the cap (25) is greater than 2.5 times the area of the cross-section of conduit (22). This embodiment of cap (25) produces an improved particulate loading to the elements (6) relative to round caps, with some of the particles being blown directly to the vessel bottom and vessel outlet opening (8).

FIG. 4 shows a perspective view of an embodiment of grid (40), wherein grid (40) is a grid arranged in two tiers or sections—a top section (33) and a bottom section (34). Top section (33) and bottom section (34) each comprise a series of parallel members connected to connection points (35).

Connection points (35) are connected to plate (2) via rods, slats or other known means (not shown) of mechanically connecting grid (40) to plate (2). Thus, plate (2), filter elements (6) and grid (40) form an assembly that can be constructed outside vessel (1) and affixed as an integrated unit into vessel (1).

Filter supports (37) may be affixed on the top of top section (33) at the location of spacers (36) to secure the bottom of filter elements (6) in the manner described in WO03/080221. A bundle of filter elements (6) usually comprise 48 filter elements. For clarity, FIG. 4 shows only one filter support (37), but in operation, the bottom of each filter element (6) would be affixed to a filter support (37).

The bottom section (34) of grid (40) may be welded or otherwise attached to the bottom of top section (33) at an angle to form a grid of openings in plate (2). Spacers (36) serve as connection points between top section (33) and bottom section (34) of grid (40). Connection points (35) may also serve to space top section (33) from bottom section (34), as shown in FIG. 4. The members can be bars, rods, slats or any other shape that allows for openings in grid (40) when placed at an angle to each other. Preferably, bottom section (34) is welded to the bottom of top section (33) such that the parallel members of each section form an angle with each other of 30 to 90 degrees, preferably 60 degrees.

In another embodiment, bottom section (34) is attached to top section (33) at a distance of from 1 cm to 10 cm below the bottom of top section (33), by varying the length of spacers (36), to form a grid of openings between top section (33) and bottom section (34) such that the parallel members of each section form an angle with each other of 30 to 90 degrees, preferably 60 degrees.

The embodiment of grid (40) shown in FIG. 4 reduces the accumulation of ash that can result in "bridges" of ash being formed which can block the flow of particulate-poor gas into the second space (5).

The invention is also directed to a process for removing solid particles from a gas containing solid particles in a vertically arranged vessel, by performing the following steps:

(a) feeding the gas containing solid particles to a cyclone separator in a first space as present in the lower end of the vessel to obtain a gas more poor in solids gas and a first quantity of solids, (b) transporting the gas more poor in solids to a filter element, which filter element is present above the cyclone separator in said first space, to obtain a gas even more poor in solids in a second space and a second quantity of solids, (c) discharging the gas which is even more poor in solids from said second space, (d) transporting by means of gravity the first and second quantity of solids to the lower end of the vessel and discharging said solids from the vessel via a vessel outlet opening for discharge of solids.

Preferably the above process is performed in the vessel according to the invention. The nominal gas flow through one filter element 6, i.e. filter candle, is preferably between 10-100 actual cubic foot per min. The vessel and process according to the invention can be suitably used to remove solids, for example char, from gaseous process streams containing for example up to 4 percent by weight of solids to obtain a cleaned gas containing preferably between 0 and 2 ppm solids. Suitable processes in which the apparatus can be used are Fluidized Catalytic Cracking (FCC) processes, Coal Gasification processes, Pressurised Fluid Bed Combuster (PFBC) and Integrated Gasification Combined Cycle (IGCC) coal based power systems.

What is claimed is:

1. A vessel for separating solid particles from a gas containing solid particles, the vessel comprising a plate provided with openings across the vessel such that the plate divides the vessel in a first and second space, a number of filter elements extending from the openings into the first space, a vessel opening for receiving the gas containing solid particles, fluidly connected to the first space, an vessel outlet opening for discharge of solids, fluidly connected to the first space and a vessel outlet opening for gas, fluidly connected to the second space, wherein the first space further comprises one or more cyclone separation devices having an inlet fluidly connected to the vessel opening for receiving the gas containing solid particles, a cyclone gas outlet fluidly connected to the first space and a solids cyclone outlet, and wherein the cyclone gas outlet is fluidly connected to the first space via a conduit having a gas outlet which is closer to the filter elements than to the vessel outlet opening for discharge of solids, and wherein the conduit further comprises a triangular cap, and wherein the vessel further comprises a grid connected to the plate and to which the filter elements are affixed, comprising a bottom section and a top section, the bottom section and top section being comprised of a set of parallel members connected to a frame, the bottom and top section being positioned relative to each other such that openings are formed in the grid.

2. A vessel according to claim 1, wherein the cyclone separation device comprises of a tubular wall section, which wall section is provided with a tangentially arranged inlet that is fluidly connected to the vessel opening for receiving the gas containing solid particles, which wall section is open at the solids cyclone outlet and closed by a cyclone roof at its opposite end and wherein an outlet conduit is positioned co-axial with the tubular wall section through the cyclone roof and wherein an inlet of the outlet conduit is the cyclone gas outlet.

3. A vessel according to claim 2, wherein in an open end of the section a hollow cone shaped insert is co-axially positioned having a, locally, smaller diameter than the tubular wall section to create a circular solids cyclone outlet between the cone shaped insert and the tubular wall section.

4. A vessel according to claim 1, wherein the triangular cap has an area greater than 2.5 times the cross-sectional area of the conduit.

5. A vessel according to claim 1 wherein from 2 to 6 cyclone separation devices are connected to the vessel opening for receiving the gas containing solid particles.

6. A vessel according to claim 1, wherein the bottom section and top section of the grid are positioned such that the parallel members form a 60 degree angle with each other.

7. A vessel according to claim 1, wherein the bottom section of the grid is mounted in the vessel from 1 to 10 cm below the bottom of the top section of the grid.

8. A process for removing solid particles from a gas containing solid particles in a vertically arranged vessel, by performing the following steps:

(a) feeding the gas containing solid particles to a cyclone separator in a first space as present in the lower end of the vessel to obtain a gas more poor in solids and a first quantity of solids, (b) transporting the gas more poor in solids to a filter element, which filter element is present above the cyclone separator in the first space, to obtain a gas even more poor in solids in a second space and a second quantity of solids, wherein the first space and the second space are separated by a plate, (c) discharging the gas which is even more poor in solids from the second space, (d) transporting by means of gravity the first and second quantity of solids to the lower end of the vessel and discharging the solids from the vessel via a vessel outlet opening for discharge of solids;

wherein the vessel comprises a plate provided with openings across the vessel such that the plate divides the vessel in a first and second space, a number of filter elements extending from the openings into the first space, a vessel opening for receiving the gas containing solid particles, fluidly connected to the first space, a vessel outlet opening for discharge of solids, fluidly connected to the first space and a vessel outlet opening for gas, fluidly connected to the second space, wherein the first space further comprises one or more cyclone separation devices having an inlet fluidly connected to the vessel opening for receiving the gas containing solid particles, a cyclone gas outlet fluidly connected to the first space and a solids cyclone outlet, and wherein the cyclone gas outlet is fluidly connected to the first space via a conduit having a gas outlet which is closer to the filter elements than to the vessel outlet opening for discharge of solids, and wherein the conduit further comprises a triangular cap, and wherein the vessel further comprises a grid connected to the plate and to which the filter elements are affixed, comprising a bottom section and a top section, the bottom section and top section being comprised of a set of parallel members connected to a frame, the bottom and top section being positioned relative to each other such that openings are formed in the grid.

* * * * *